(12) United States Patent
Keesman

(10) Patent No.: US 6,377,624 B1
(45) Date of Patent: Apr. 23, 2002

(54) DEVICE FOR TRANSMITTING A PLURALITY OF TELEVISION SIGNALS THROUGH A TRANSMISSION CHANNEL

(75) Inventor: Gerrit J. Keesman, Eindhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 08/304,015

(22) Filed: Sep. 9, 1994

(30) Foreign Application Priority Data

Sep. 10, 1993 (BE) ............................................ 09300951

(51) Int. Cl.⁷ ................................................ H04N 7/12
(52) U.S. Cl. .......................... 375/240.03; 375/240.02; 348/385.1; 348/423.1
(58) Field of Search .................. 348/385, 387, 348/388, 17, 21, 385.1, 423.1; 375/240.02, 240.03, 240.11, 240.19, 240.26, 240.29, 240.1

(56) References Cited

U.S. PATENT DOCUMENTS

| 4,975,771 | A | * | 12/1990 | Kassatly | ...................... 348/385 |
| 5,027,207 | A | * | 6/1991 | Fujisaki et al. | ............. 348/385 |
| 5,115,309 | A | * | 5/1992 | Hang | .......................... 348/385 |
| 5,216,503 | A | * | 6/1993 | Paik et al. | ................... 348/385 |
| 5,231,494 | A | * | 7/1993 | Wachob | ....................... 348/385 |

FOREIGN PATENT DOCUMENTS

| EP | 0527632 | * | 2/1993 | ............ H04N/7/08 |
| JP | 0564175 | * | 3/1993 | ............ H04N/7/30 |

OTHER PUBLICATIONS

NTC'77 Conference Record, vol. 3, pp. 41:4-1 to 41:4-5, "Digital Transmission of Broadcast Television with Reduced Bit Rate", by Kaneko, 1977.

ISO/IECCJTC1/S29/WG11/N0400 "Test Model 5", Apr. 1993.

ISO–IEC DIS 11172 "Coding of moving pictures and associated audio for digital storage media up to about 1.5Mbit/s",.

NTC'77 Conference Record, vol. 3, 1977, New York (US) pp. 41 4 1–41 4 6 H. Kaneko E. A. 'Digital Transmission of Broadcast Television with Reduced Bit Rate'.

IEEE Transactions on Consumer Electronics, vol. 38, No. 4, Nov. 1992, New York US, pp. 778–783, R. Saint Girons E.A. 'The Digital Simulcast AD–HDTV Coding System.'

* cited by examiner

*Primary Examiner*—Vu Le
(74) *Attorney, Agent, or Firm*—Russell Gross

(57) ABSTRACT

A device for simultaneously transmitting a plurality of television signals comprises an adjusting circuit (5) for adjusting the bitrate for each television signal in dependence upon the complexity of this signal with respect to the joint complexity of the plurality of television signals. The device provides improvement of quality in Digital Video Broadcast systems. It has also been found to be possible to transmit extra signals through a given channel while maintaining the picture quality. Use of the device in optical recording provides the possibility of a longer playing time.

7 Claims, 3 Drawing Sheets

DEVICE FOR TRANSMITTING A PLURALITY OF TELEVISION SIGNALS THROUGH A TRANSMISSION CHANNEL

FIELD OF THE INVENTION

The invention relates to a device for transmitting a plurality of television signals through a transmission channel. The invention also relates to a device for storing a television signal and a device for playback of said signal.

BACKGROUND OF THE INVENTION

For future Digital Video Broadcast (DVB) systems it is being considered to transmit a plurality of television signals simultaneously through one digital transmission channel. A device used for this purpose comprises an encoder for each television signal for encoding this signal in a bit stream, control means for controlling the bitrate of each bit stream and means for combining the bit streams to a channel bit stream.

Inter alia, the MPEG2 standard which is being developed is suitable for encoding each television signal. An encoder used for this purpose is described in ISO/IECCJTC1/SC29/WG11/N0400 "Test Model 5", April 1993. The known MPEG2 encoder forms a bit stream for the television signal, whose bitrate is controlled in conformity with a target value. If there is a risk that the target value is not achieved, for example when complex picture scenes occur, the picture is quantized in a coarser way in order that fewer bits per picture are generated. In practice the picture quality of the encoded television signal will consequently vary from scene to scene and may even be noticeably poor.

When transmitting a plurality of television signals through one digital transmission channel, the available channel bitrate is divided into a plurality of bitrates, one of which is allocated to each television signal. The allocated bitrates have been fixed in advance. For each of the transmitted television signals it now holds that the picture quality of complicated picture scenes may be subject to degradation.

OBJECT AND SUMMARY OF THE INVENTION

It is an object of the invention to provide a device for transmitting a plurality of television signals through a transmission channel with which a higher picture quality is achieved.

To this end the device according to the invention is characterized in that the control means are adapted to control the bitrate of each signal in dependence upon the complexity of said signal with respect to the joint complexity of the plurality of television signals.

The invention is based on the recognition that upon transmission of a plurality of television signals through one transmission channel not all television signals will be simultaneously complicated. For example, if two television signals A and B are transmitted and if, at a given moment, signal A comprises a scene which is not so complex and signal B comprises a very complex scene, signal B will be temporarily transmitted at a higher bitrate at the expense of the bitrate of signal A. This process of dynamic allocation of bitrates will hereinafter be referred to as "joint bitrate control".

In known stand-alone encoders, for example MPEG encoders, each encoder has its own control means for achieving a predetermined target value of the bitrate. An embodiment of a device on this basis comprises a common adjusting circuit for applying a bitrate target value to each of the control means in dependence upon the complexity of the corresponding television signal. The complexity can be measured by a preanalysis circuit, for example in the form of an additional encoder. The complexity may also be computed from the number of bits and an average step size with which a previous picture of said television signal has been encoded. This possibility has the advantage that such a computation is already possible in MPEG encoders.

A further embodiment of the device is characterized in that the control means are adapted to form a joint control value for each encoder in dependence upon the joint complexity of the plurality of television signals. In this embodiment the bitrate of each bit stream is directly representative of the complexity of the signal. Therefore, the complexity need not be measured separately.

It has been found that joint bitrate control reduces the risk of occurrence of a noticeably poor picture quality in each of the signals. The picture quality of the transmitted television signals thus roughly increases. However, joint bitrate control also provides the possibility of transmitting more television signals through the same transmission channel while maintaining the picture quality. It has been found that five television signals can be transmitted through a 20 Mbit/s channel at the same picture quality as four television signals having a constant bitrate of 5 Mbit/s.

Further attractive possibilities of using joint bitrate control are obtained by dividing a television program into a plurality of parts of equal length and by simultaneously storing these parts as one channel bit stream on an optical disc by means of joint bitrate control. The television signal is reproduced by repeatedly reading the stored channel bit stream and by each time decoding a different part. Either a longer playing time or a higher picture quality is then obtained.

DETAILED DESCRIPTION OF THE PREFERRED EMBODIMENTS

Figure 1:
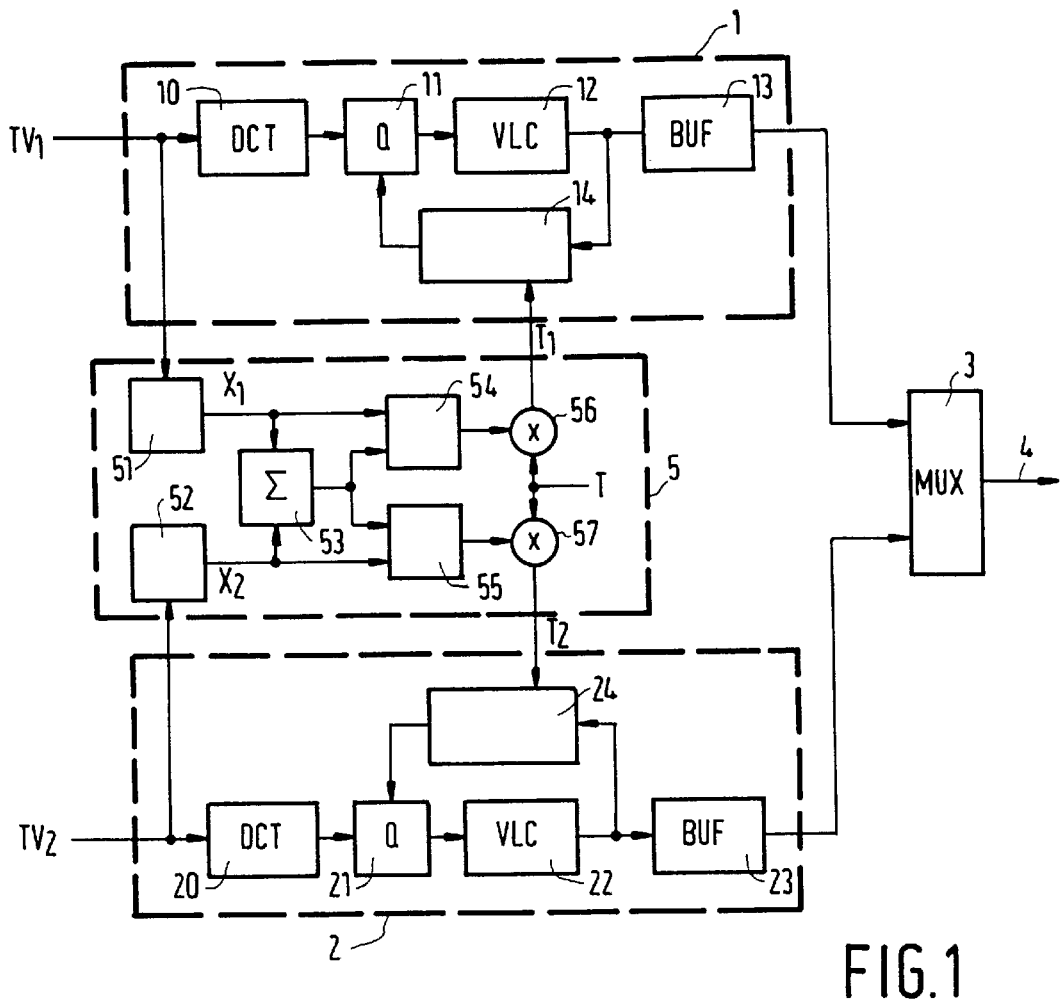
FIG. 1 shows a possible embodiment of a device for transmitting a plurality of television signals according to the invention.

FIG. 1 shows a device for transmitting a plurality of television signals according to the invention. A device for transmitting two television signals $TV_1$ and $TV_2$ is taken as an embodiment. Television signal $TV_1$ is applied to an encoder 1. This encoder comprises a Discrete Cosine Transformer 10 which transforms blocks of pixels into series of coefficients. The coefficients obtained are quantized at a given step size in a quantizer 11 and the quantized coefficients are subsequently encoded in a variable length encoding circuit 12. The code words obtained are applied to a buffer 13. The produced number of bits, which fluctuates from picture to picture, is applied to a bitrate control circuit 14 which, in response thereto, controls the step size of quantizer 11 in such a way that the average number of applied bits per picture is equal to a target value $T_1$. Such a bitrate control circuit is known per se. In a corresponding manner, television signal $TV_2$ is processed in an encoder 2. This encoder also comprises a transformer 20, a quantizer 21, a variable length encoder 22, a buffer 23 and a bitrate control circuit 24. A target value $T_2$ is applied to the control circuit 24. The two bit streams are combined in a multiplexer 3 to one channel bit stream having a channel bitrate which corresponds to $T=T_1+T_2$ bits/picture. The channel bit stream is applied to a transmission channel 4.

In accordance with the invention, the device is provided with a joint bitrate adjusting circuit 5. This circuit determines a complexity value for both television signals ($X_1$ for the first television signal and $X_2$ for the second television signal) which is representative of the complexity of the current picture scenes, and distributes the available channel bitrate T among the two signals in proportion with their complexity.

In a possible embodiment of the device the complexity values $X_1$ and $X_2$ are obtained by subjecting each applied television signal to a preanalysis. To this end the adjusting circuit 5 comprises a preanalysis circuit 51 and 52 for the two respective television signals. Such a preanalysis circuit comprises, for example a picture transformer, a quantizer having a fixed step size and a variable length encoder, as well as a counter for counting the number of bits thus obtained for each picture. In this embodiment said number of bits constitutes the complexity value X. The two complexity values $X_1$ and $X_2$ are added together in a summing device 53. Subsequently, the relative complexity of each television signal is determined in dividers 54 and 55. To this end the dividers compute:

$$\frac{X_1}{X_1+X_2} \text{ and } \frac{X_2}{X_1+X_2} \text{ respectively.}$$

Finally, the target values $T_1$ and $T_2$ are computed by means of multipliers 56 and 57 by multiplying the available channel bitrate T (expressed in bits/picture) by the relative complexity of the television signals. It now holds for the target values that:

$$T_1 = \frac{X_1}{X_1+X_2} \times T \text{ and } T_2 = \frac{X_2}{X_1+X_2} \times T$$

If there are N television signals, it holds for the target value $T_n$ (n=1 ... N) which is applied to the $n^{th}$ encoder:

$$T_n = \frac{X_n}{\sum_{n=1}^{N} X_n} \times T$$

The device allocates a bitrate to each television signal in proportion with its complexity. A picture quality is then obtained which is substantially equal for all signals. However, it is alternatively possible to allocate a distinct picture quality to the television signals. This is achieved by influencing the relative complexity of the signals in a predetermined manner. In that case the dividers 54 and 55 are implemented, for example for computing:

$$\frac{\alpha_1 X_1}{\alpha_1 X_1 + \alpha_2 X_2} \text{ and } \frac{\alpha_2 X_2}{\alpha_1 X_1 + \alpha_2 X_2} \text{ respectively.}$$

in which $\alpha_1$ and $\alpha_2$ are constants. For signals of equal complexity ($X_1=X_2$) an unequal bitrate is now obtained.

Figure 2:
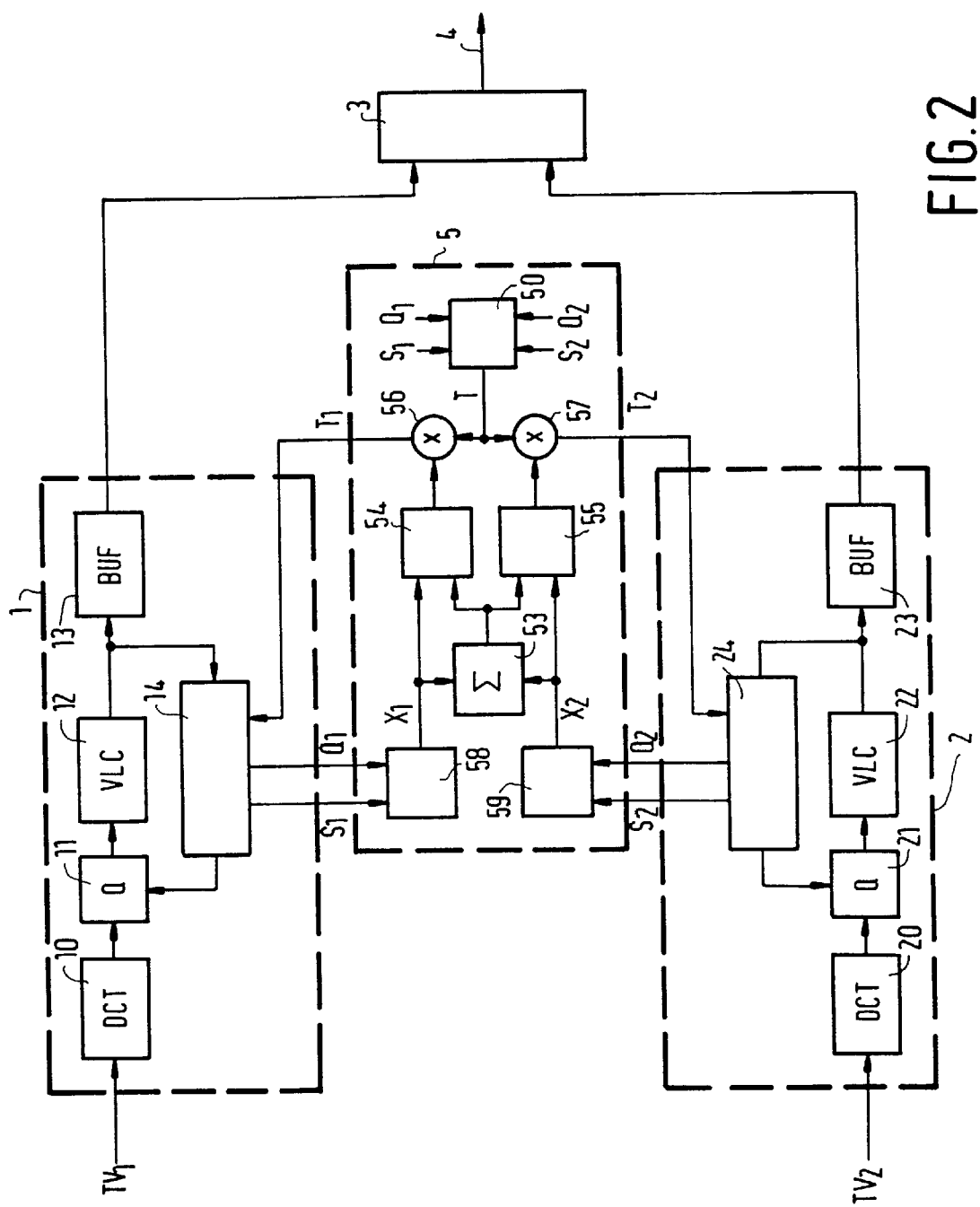
FIG. 2 shows a further embodiment of the device.

FIG. 2 shows a further embodiment of the device. In this embodiment the encoders 1 and 2 are assumed to be MPEG encoders. As may be known (see for example ISO-IEC DIS 11172 "Coding of moving pictures and associated audio for digital storage media up to about 1.5 Mbit/s"), the television signal in the MPEG standard is transmitted in the form of Groups Of Pictures (GOPs). Each GOP comprises an intraframe coded picture (I picture), a number of predictively coded pictures (P pictures) and a number of bidirectionally predictive coded pictures (B pictures). For the sake of simplicity the customary prediction loop for forming a motion-compensated prediction picture in encoders 1 and 2 has not been shown in FIG. 2. In accordance with the invention the adjusting circuit 5 now comprises:

(A) computing means 58 and 59 for computing the complexity $X_n$ of each of the N television signals to be transmitted. As an alternative to the preanalysis circuit shown in FIG. 1, the complexity value is now determined with reference to the number of bits S which is spent on coding the previous picture and a quantization parameter Q which is representative of the average step size with which this picture is quantized. Both values S and Q are applied to the adjusting circuit by each encoder. Chapter 10 of the afore-mentioned ISO document "MPEG2 Test Model 5" describes that the product of S and Q is a representative measure of the complexity of the television signal. By separately determining this product for each type of picture (I, P and B), three complexity values $X_I$, $X_P$ and $X_B$ are obtained for each television signal $TV_n$ (n=1, 2):

$$X_{In}=S_{In} \times Q_{In}, X_{Pn} \times Q_{Pn}$$

and $$X_{Bn}=S_{Bn} \times Q_{Bn}$$

Alternative formulas are possible. It is notably sensible to emphasize the influence of the quantization value on the complexity value as in, for example:

$$X^* = S^* \times Q^{*\alpha}(\alpha>1) \text{ or in } X^* = S^* \times e^{Q^*}$$

in which the index * refers to the type of picture (I, P, B).

(B) a summing device 53 and dividers 54, 55 for determining, for each type of picture, the relative complexity of each signal in accordance with the equations:

$$\frac{X_{In}}{\sum_{n=1}^{N} X_{In}}, \frac{X_{Pn}}{\sum_{n=1}^{N} X_{Pn}} \text{ and } \frac{X_{Bn}}{\sum_{n=1}^{N} X_{Bn}}$$

(C) computing means 50 for computing, for each type of picture, the total number of bits T for the subsequent image of the joint signals. Analogously to a stand-alone MPEG2 decoder (see chapter 10 of MPEG2 Test Model 5) the following computations can be performed:

$$T_1 = \frac{R}{1 + \frac{n_P \cdot X_P}{X_I \cdot K_P} + \frac{n_B \cdot X_B}{X_I \cdot K_B}}, T_P = \frac{R}{n_P + \frac{n_B \cdot K_P \cdot X_B}{K_B \cdot X_P}} \text{ and} \quad (1)$$

-continued $$T_B = \frac{R}{n_B + \frac{n_P \cdot K_B \cdot X_P}{K_P \cdot X_B}}$$

in which $n_P$ and $n_B$ represent the number of P and B pictures still to be encoded in the GOP and $K_P$ and $K_B$ are specific system constants.

In formula (1), $X_I$, $X_P$ and $X_B$ represent the joint complexity of the television signals, as if their pictures jointly form a superpicture. This joint complexity value can be constituted by:

$$X_I = \sum_{n=1}^{N} S_{In} \times Q_{In}, \; X_P = \sum_{n=1}^{N} S_{Pn} \times Q_{Pn} \text{ and } X_B = \sum_{n=1}^{N} S_{Bn} \times Q_{Bn}$$

or by:

$$X_I = \sum_{n=1}^{N} S_{In} \times \sum_{n=1}^{N} Q_{In}, \; X_P = \sum_{n=1}^{N} S_{Pn} \times \sum_{n=1}^{N} Q_{Pn} \text{ and}$$

$$X_B = \sum_{n=1}^{N} S_{Bn} \times \sum_{n=1}^{N} Q_{Bn}$$

To this end, the computing means 50 receive from each encoder its spent number of bits S and the average step size Q.

In formula (1), R is the remaining number of bits which is allocated to the joint GOPs (superGOP). The initial value of R is the number of available bits/superGOP. For a stand-alone encoder this is denoted by G. In the device according to the invention, the initial value is N×G. R is reduced after encoding of each superpicture by the number of spent bits ($S_I$, $S_P$, $S_B$, respectively).

(D) multipliers 56 and 57 for distributing the target value T for the superpicture among the N encoders in proportion with the relative complexity of the corresponding television signal. In a formula this is expressed by:

$$T_{In} = \frac{X_{In}}{\sum_{n=1}^{N} X_{In}} \times T_I, \; T_{Pn} = \frac{X_{Pn}}{\sum_{n=1}^{N} X_{Pn}} \times T_P \text{ and } T_{Bn} = \frac{X_{Bn}}{\sum_{n=1}^{N} X_{Bn}} \times T_B$$

In the manner thus described, encoder 1 receives a target value $T_{I1}$, $T_{P1}$ and $T_{B1}$ for each type of picture (I, P or B). In a further autonomous manner, the control circuit 14 of the encoder will attempt to meet this target. In a corresponding manner, decoder 2 receives a target value $T_{I2}$, $T_{P2}$ and $TB_{B2}$. Thus it holds for each encoder that the applied target value is dependent on the relative complexity of the corresponding television signal with respect to the other television signals.

Figure 3:
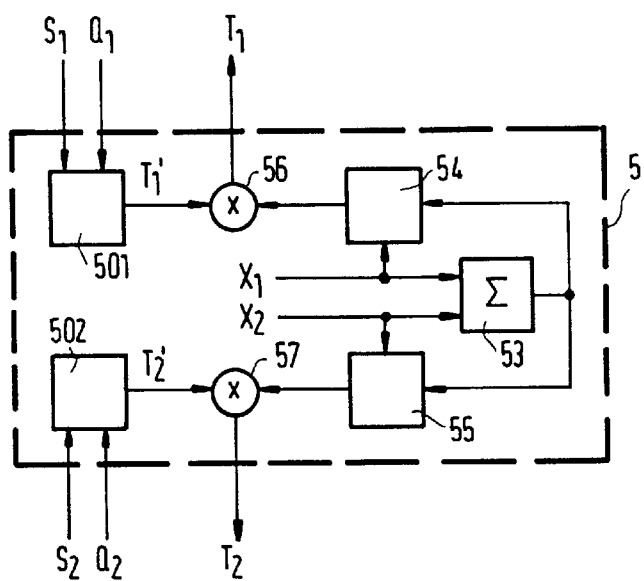
FIG. 3 shows an alternative embodiment of an adjusting circuit shown in FIG. 2.

FIG. 3 shows an alternative embodiment of adjusting circuit 5 for use in the device shown in FIG. 2. Identical reference numerals represent identical functions in this case. The adjusting circuit differs from the one shown in FIG. 2 in that the computing means (cf. 50 in FIG. 2) are now split up into two identical computing means 501 and 502. They compute, for each television signal, the number of bits for the next picture as if the full channel bitrate were available for the signal. The afore-mentioned formula (1) applies to the computation, in which $X_I$, $X_P$ and $X_B$ now represent the complexity value of the corresponding (instead of the joint) television signal. The number of bits thus computed is denoted by T'$_1$ and T'$_2$ in FIG. 3. It is this number which is multiplied (56, 57) by the relative complexity of the corresponding signal. The relative complexity is obtained in the same manner (summing device 53, dividers 54 and 55) as in FIG. 2.

Figure 4:
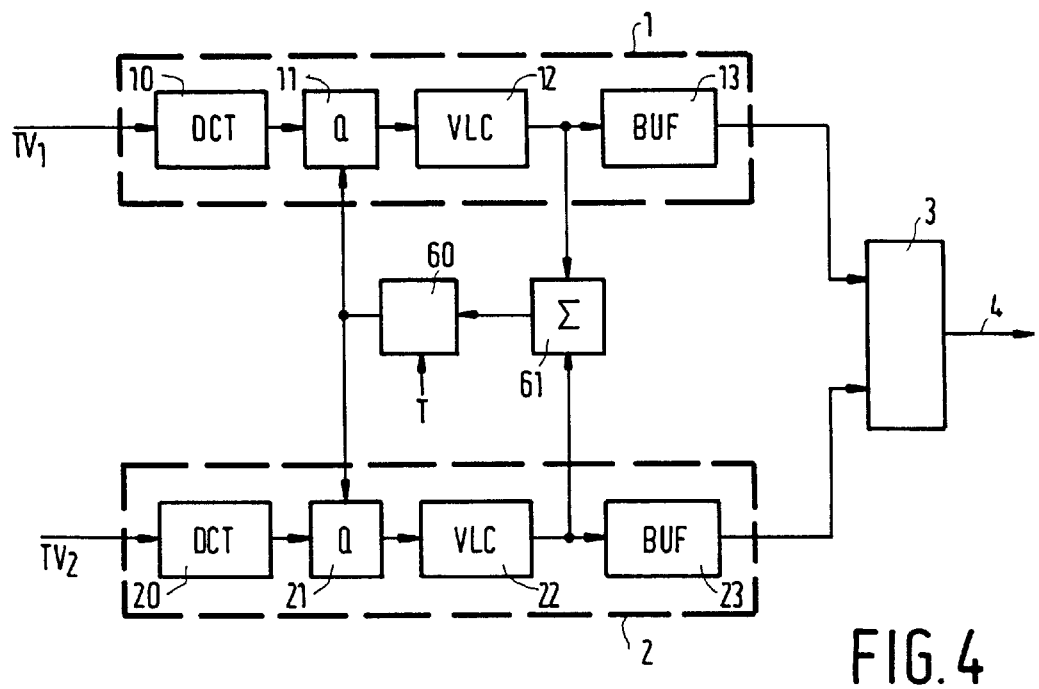
FIG. 4 shows another embodiment of the device.

FIG. 4 shows another embodiment of the device according to the invention. This embodiment is distinguished from the previously described embodiments in that the quantizers 11 and 21 of a joint control circuit 60 receive an average step size which is equal for both encoders (if desired, the step size may vary from macroblock to macroblock within a picture, dependent on the activity). The control circuit receives a target value T which corresponds to the channel bitrate and controls the average quantization step size as a function of the number of bits which is jointly produced by the encoders. This number is supplied by an adder 61. The control circuit has the same structure as the known control circuit of a stand-alone encoder (cf. 14 and 24 in FIGS. 1 and 2) and does not need any further explanation. Since the step size for each encoder is equal in this embodiment (i.e. $Q_1=Q_2=Q$), the complexity of each signal (i.e. $X_n=S_n.Q$) is directly represented by the number of spent bits $S_n$. A separate measurement of the complexity is therefore superfluous. As is apparent from $$S_n = \frac{X_n}{Q} = \frac{X_n}{X_1 + X_2} \times \frac{X_1 + X_2}{Q} = \frac{X_n}{X_1 + X_2} \times (S_1 + S_2)$$

the bitrate for each signal is also proportional to its complexity in this embodiment. The picture quality is equal for both signals because both encoders quantize at the same step size. If a distinct picture quality is desired for each television signal, the step size generated by the control circuit 60 may be split up into two different step sizes which have a predetermined fixed ratio with respect to each other.

For all previously described embodiments of the device it holds that the current bitrates of the N television signals can be transmitted to a receiving decoder in the form of appropriate parameters for each picture or for each GOP. The MPEG standard already provides this possibility.

By using joint bitrate control, the picture quality of each television signal increases. This is a significant advantage for broadcast systems. Joint bitrate control also provides the possibility of transmitting extra signals. For example, instead of two stand-alone 5 Mbit/s television encoders, two centrally controlled encoders having a joint bitrate of 9 Mbit/s can be coupled to a 10 Mbit/s channel while maintaining the picture quality. Via the remaining 1 Mbit/s, for example an extra data signal can be transmitted. Theoretical considerations and practical experiments have further proved that a larger number of television programs can be transmitted while maintaining the picture quality, for example 5 programs instead of 4, or 27 programs instead of 20.

Figure 5:
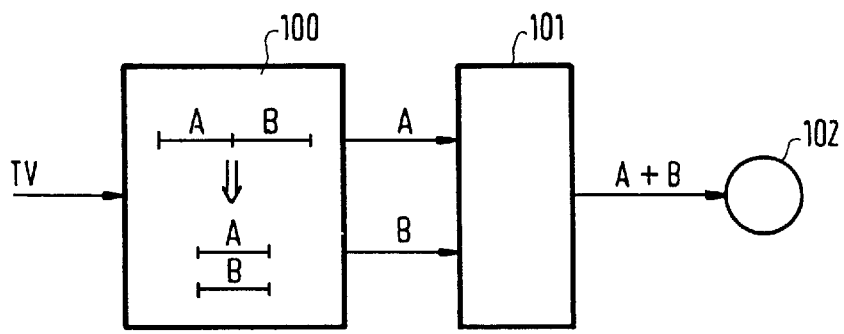
FIG. 5 shows a device for storing a television signal according to the invention.
Figure 6:
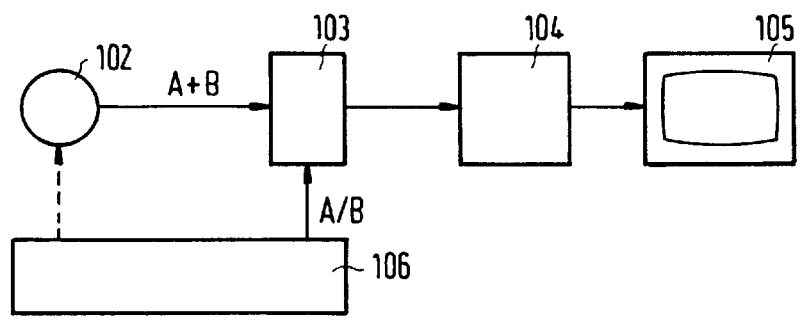
FIG. 6 shows a device for playback of a television signal according to the invention.

In addition to broadcasting, joint bitrate control also provides interesting possibilities of application for recording. FIG. 5 shows a device for storing a television program on a storage medium. The device comprises means 100 for splitting the television program into two parts A and B of equal length. These means may be constituted by, for example two video recorders which play back the first and the second half, respectively, of the program. The two parts A and B are applied to a device 101. In the manner described hereinbefore, device 101 forms one channel bit stream A+B of the two parts, which channel bit stream is stored on an optical disc 102. FIG. 6 shows the corresponding device for playback of the optical disc. The channel bit stream A+B read from disc 102 is applied to a selector 103 which first selects bit stream A and applies it to an MPEG2 decoder 104. The decoded signal is displayed on picture monitor 105. Under the control of a control circuit 106 the same channel bit stream is subsequently read again after finishing of part A. Now, however, bit stream B is selected and decoded. During reset of the read head (approximately 0.8 sec in practice) the last picture of part A may be displayed as a still picture. Should this be troublesome, a buffer may be used for bridging this period. This application of joint bitrate control in recording requires a disc rotating at a (substantially) double speed and a more complex disc control. This is, however, offset by a better picture quality or a longer playing time.

I claim:

1. A device for transmitting a plurality of television signals through a transmission channel having a predetermined channel bit rate, comprising:

encoding means for encoding respective ones of the television signals into respective bit streams;

combining means for combining the bit streams into a channel bit stream;

complexity determining means for determining the complexity of each television signal on the basis of a current frame thereof, for determining the total complexity of all of the television signals on the basis of the current frame thereof, and for determining the relative complexity of each television signal on the basis of the current frame thereof; and, control means for controlling the bit rate of each bit stream in such a manner that the bit rate allocated to each bit stream is proportional to its relative complexity.

2. The device as set forth in claim 1, wherein the channel bit stream comprises an MPEG bit stream.

3. A device for transmitting a plurality of television signals through a transmission channel having a predetermined channel bit rate, comprising:

a plurality of encoders which encode respective ones of the television signals into respective bit streams;

a bit stream combiner which combines the bit streams into a channel bit stream;

a complexity determination circuit which determines the complexity of each television signal on the basis of a current frame thereof, which determines the total complexity of all of the television signals on the basis of the current frame thereof, and which determines the relative complexity of each television signal on the basis of the current frame thereof; and, a control circuit which controls the bit rate of each bit stream in such a manner that the bit rate allocated to each bit stream is proportional to its relative complexity.

4. The device as set forth in claim 3, wherein the channel bit stream comprises an MPEG bit stream.

5. A device for transmitting a plurality of television signals through a transmission channel having a predetermined channel bit rate, comprising:

a plurality of encoders which encode respective ones of the television signals into respective bit streams;

a bit stream combiner which combines the bit streams into a channel bit stream;

a complexity determination circuit which determines the complexity of each television signal, which determines the total complexity of all of the television signals, and which determines the relative complexity of each television signal; and, a control circuit which receives a target value of bits which corresponds to the channel bit rate, which dynamically controls an average quantization step size used by each of the encoders as a function of the total number of bits produced by all of the encoders, and which controls the bit rate of each bit stream in such a manner that the bit rate allocated to each bit stream is proportional to its relative complexity, wherein the average quantization step size is equal.

6. The device as set forth in claim 5, wherein the complexity determination circuit determines the complexity and relative complexity of each television signal on the basis of a current frame thereof.

7. The device as set forth in claim 6, wherein the channel bit stream comprises an MPEG bit stream.

* * * * *